(12) United States Patent
Ouyang et al.

(10) Patent No.: US 7,584,672 B2
(45) Date of Patent: Sep. 8, 2009

(54) MAGNETOSTRICTIVE TORQUE SENSOR

(75) Inventors: Song Ouyang, Hitachi (JP); Yukio Ikeda, Hitachi (JP); Kouichi Sato, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/526,075

(22) Filed: Sep. 25, 2006

(65) Prior Publication Data
US 2007/0227268 A1  Oct. 4, 2007

(30) Foreign Application Priority Data
Sep. 26, 2005 (JP) ............... 2005-278244

(51) Int. Cl.
*G01L 3/00* (2006.01)
(52) U.S. Cl. ................................. 73/862.331
(58) Field of Classification Search .............................. 73/862.331–862.338
See application file for complete search history.

(56) References Cited

U.S. PATENT DOCUMENTS

| | | | | |
|---|---|---|---|---|
| 4,803,885 A | * | 2/1989 | Nonomura et al. ..... | 73/862.333 |
| 5,321,985 A | * | 6/1994 | Kashiwagi et al. ..... | 73/862.335 |
| 5,526,704 A | * | 6/1996 | Hoshina et al. ........ | 73/862.335 |
| 5,831,180 A | * | 11/1998 | Tanaka et al. .......... | 73/862.333 |
| 5,850,045 A | * | 12/1998 | Harada et al. .......... | 73/862.333 |
| 6,490,934 B2 | * | 12/2002 | Garshelis ............... | 73/862.336 |
| 6,823,746 B2 | * | 11/2004 | Viola et al. ............. | 73/862.335 |
| 6,871,553 B2 | * | 3/2005 | Naidu et al. ............ | 73/862.331 |
| 7,343,825 B2 | * | 3/2008 | Masaki et al. .......... | 73/862.333 |
| 2005/0160835 A1 | | 7/2005 | Masaki | |
| 2006/0179959 A1 | * | 8/2006 | Ouyang et al. ......... | 73/862.331 |

FOREIGN PATENT DOCUMENTS

JP   2005-208008   4/2005
JP   2005-164531   6/2005

\* cited by examiner

*Primary Examiner*—Lisa M Caputo
*Assistant Examiner*—Octavia Davis
(74) *Attorney, Agent, or Firm*—McGinn IP Law Group, PLLC

(57) ABSTRACT

A magnetostrictive torque sensor having: a rotating shaft to rotate around a center axis, the rotating shaft having magnetostrictive characteristics; and a cylindrical magnetic core disposed at a predetermined distance on an outer periphery of the rotating shaft, the cylindrical magnetic core having a detection coil disposed on an inner periphery thereof to detect a torque applied to the rotating shaft. The detection coil is formed with a coil assembly to form a bridged circuit, and the coil assembly is formed with a flexible substrate coil disposed on a whole inner periphery of the magnetic core.

19 Claims, 15 Drawing Sheets

MAGNETOSTRICTIVE TORQUE SENSOR

The present application is based on Japanese patent application No. 2005-278244, the entire contents of which are incorporated herein by reference.

BACKGROUND OF THE INVENTION

1. Field of the Invention

The present invention relates to a magnetostrictive torque sensor to detect a torque applied to a rotating shaft having magnetostrictive characteristics, based on a change in inductance of a detection coil.

2. Description of the Related Art

In power steering mechanism, engine control mechanism, power transmission device etc. for vehicle, it is highly necessary to detect a torque applied to a steering shaft and other passive axes etc. that are rotating shafts.

It is generally known that a material having the magnetostrictive characteristics, for example, Ni, Fe—Al alloy, Fe—Co alloy etc. causes a variation in relative permeability when external force is applied thereto, where the relative magnetic permeability decreases in the compression stress direction and increases in the tensile stress direction.

JP-A-2005-164531 discloses a magnetostrictive torque sensor using this principle.

As shown in FIG. 13, the magnetostrictive torque sensor 110 of JP-A-2005-164531 comprises a rotating shaft 111 having magnetostrictive characteristics, a pair of semi-cylindrical magnetic cores 114, 115 having detection coils attached onto its inner periphery surface, the coils comprising coils 112a, 113a inclined at an angle of +45° to the center axis O of the rotating shaft 111 and coils 112b, 113b inclined at an angle of −45° to the center axis O, and an alternating current signal generating circuit (not shown) for applying an alternating current voltage to the coils disposed in the semi-cylindrical magnetic cores 114, 115.

In the magnetostrictive torque sensor, it is simulated that, as shown in FIG. 14, a torque T is applied to the rotating shaft 1 such that it is produced in the counter-clockwise direction on the left side of the drawing and in the clockwise direction on the right side of the drawing (herein, these directions of the torque T is defined as a positive direction) viewed from the axial direction X. At this time, viewed from the left side of the rotating shaft 111, a compressive stress is applied in +45° direction of the rotating shaft 111, and a tensile stress is applied in −45° direction thereof. Viewed from the right side of the rotating shaft 111, a compressive stress is applied in −45° direction of the rotating shaft 111, and a tensile stress is applied in +45° direction thereof. This principal stress σ is proportional to the torque T, and derived from the following formula, when a diameter of the rotating shaft 111 is determined as D:

$$\sigma = 16T/(\pi D^3) \quad (1)$$

If the rotating shaft 111 has the magnetostrictive effect, an axial magnetic anisotropy Ku will be induced by the principal stress σ, and derived from the following formula (2).

$$Ku = 2 \cdot (3/2)\lambda s \sigma = 48 \lambda s T/(\pi D^3) \quad (2)$$

wherein λs is a saturation magnetostrictive constant of the rotating shaft 111.

Due to the axial magnetic anisotropy Ku, a +σ direction becomes an easy magnetization direction and a −σ direction becomes a difficult magnetization direction. In connection with the magnetostatic energy, the relative magnetic permeability in the easy magnetization direction, i.e., the +direction increases, and the relative magnetic permeability in the difficult magnetization direction, i.e., the −σ direction decreases to the contrary. Therefore, when current flows into the coils 112b, 113b inclined to the easy magnetization direction (i.e., the tensile stress direction), the relative magnetic permeability in the tensile stress direction increases so that faradic current flows in a direction to decrease the magnetic flux in the tensile stress direction. Then, faradic voltage is induced by the faradic current so that the inductance of the coils 112b, 113b increases. On the other hand, when current flows into the coils 112a, 113a inclined to the difficult magnetization direction (i.e., the compressive stress direction), the relative magnetic permeability in the compressive stress direction decreases so that the inductance of the coils 112a, 113a decreases.

As shown in FIG. 15, a bridged circuit for detecting a change in inductance as described above is composed of four coils 112a, 112b, 113a, and 113b. A terminal d of the coil 112a and a terminal e of the coil 112b are connected. Similarly, a terminal b of the coil 113b and a terminal g of the coil 113a are connected. A high frequency current I generated from an oscillator (i.e., an alternating current signal generating circuit) A flows into the terminal c of the coil 112a and the terminal a of the coil 113b, and flows out from the terminal f of the coil 112b and the terminal h of the coil 112a.

When a positive torque is applied to the rotating shaft 111, inductance L between the coil 112a and the coil 113a decreases by ΔL and inductance L between the coil 112b and the coil 113b increases by ΔL, so that as shown in the following formula (3), the output from the bridged circuit increases by ΔV in the positive direction.

$$\Delta V = 2 \times \omega \Delta L \times I \quad (3)$$

On the other hand, when a negative torque is applied to the rotating shaft 111, inductance L between the coil 112a and the coil 113a increases by ΔL and inductance L between the coil 112b and the coil 113b decreases by ΔL, so that as shown in the above formula (3), the output from the bridged circuit decreases by ΔV in the negative direction. Accordingly, the change of the torque T applied to the rotating shaft 111 can be detected as a change in voltage.

However, the magnetostrictive torque sensor of JP-A-2005-164531 has the disadvantage that, when the magnetostrictive characteristics of the rotating shaft 111 are not uniform, the detection amount (sensor output) of the coils 112a, 113b and the coils 112b, 113a is changed depending on its rotation angle so that reliability on the torque detection must lower, since in the semi-cylindrical magnetic core 114 the coils 112a, 113b detect the magnetostrictive characteristics in one half-circumference region of the rotating shaft 111 and in the semi-cylindrical magnetic core 115 the coils 112b, 113a detect the magnetostrictive characteristics in the other half-circumference region of the rotating shaft 111.

SUMMARY OF THE INVENTION

It is an object of the invention to provide a magnetostrictive torque sensor that can suppress a change in sensor output depending on the rotation angle of the rotating shaft (i.e., reduce the sensor-output dependency on the rotation angle of the rotating shaft) so that reliability on the torque detection can be enhanced.

(1) According to one aspect of the invention, a magnetostrictive torque sensor comprises:

a rotating shaft to rotate around a center axis, the rotating shaft comprising magnetostrictive characteristics; and a cylindrical magnetic core disposed at a predetermined distance on an outer periphery of the rotating shaft, the cylindrical magnetic core comprising a detection coil disposed on an inner periphery thereof to detect a torque applied to the rotating shaft;

wherein the detection coil comprises a coil assembly to form a bridged circuit, and the coil assembly comprises a flexible substrate coil disposed on a whole inner periphery of the magnetic core.

In the above invention (1), the following modifications and changes can be made.

(i) The detection coil comprises a pair of first coils inclined at an angle of +45° to the center axis and a pair of second coils inclined at an angle of −45° to the center axis, the pair of first coils are juxtaposed to each other along the center axis, and the pair of second coils are disposed opposed to the pair of first coils.

(ii) The detection coil comprises a pair of first coils inclined at an angle of +45° to the center axis and a pair of second coils inclined at an angle of −45° to the center axis, and the pair of first coils and the pair of second coils are stacked on the periphery of the rotating shaft.

(iii) The detection coil comprises a pair of first coils inclined at an angle of +45° to the center axis and a pair of second coils inclined at an angle of −45° to the center axis, the pair of first coils are juxtaposed to each other along the center axis and disposed at positions near the magnetic core and the rotating shaft, respectively, and the pair of second coils are disposed opposed to the pair of first coils and disposed at positions near the rotating shaft and the magnetic core, respectively.

(iv) The bridged circuit comprises the detection coil and a resistance.

(v) The detection coil comprises a first coil inclined at an angle of +45° to the center axis and a second coil inclined at an angle of −45° to the center axis, the first coil is connected to a first resistance to form the bridged circuit and disposed at a position near the rotating shaft, and the second coil is connected to a second resistance to form the bridged circuit and disposed at a position near the magnetic core.

(vi) The magnetic core comprises a pair of semi-cylindrical magnetic cores divided along a virtual plane including the center axis.

(2) According to another aspect of the invention, a magnetostrictive torque sensor comprises:

a rotating shaft to rotate around a center axis, the rotating shaft comprising magnetostrictive characteristics; and a cylindrical magnetic core disposed at a predetermined distance on an outer periphery of the rotating shaft, the cylindrical magnetic core comprising a detection coil disposed on an inner periphery thereof to detect a torque applied to the rotating shaft;

wherein the detection coil comprises a coil assembly to form a bridged circuit, the coil assembly comprises a first coil inclined at an angle of +45° to the center axis and a second coil inclined at an angle of −45° to the center axis, and the bridged circuit comprises a first resistance and a second resistance corresponding to the first coil and the second coil, respectively.

In the above invention (2), the following modifications and changes can be made.

(vii) The first coil comprises a pair of coils connected to each other and disposed on a whole inner periphery of the magnetic core, and the second coil comprises a pair of coils connected to each other and disposed on a whole inner periphery of the magnetic core.

(viii) One of the pair of coils in the first coil and one of the pair of coils in the second coil are disposed on one half region of the magnetic core, and an other of the pair of coils in the first coil and an other of the pair of coils in the second coil are disposed on an other half region of the magnetic core.

(xi) The magnetic core comprises a pair of semi-cylindrical magnetic cores divided along a virtual plane including the center axis.

ADVANTAGES OF THE INVENTION

The magnetostrictive torque sensor of the invention can suppress a change in sensor output depending on the rotation angle of the rotating shaft (i.e., reduce the sensor-output dependency on the rotation angle of the rotating shaft), so that reliability on the torque detection can be enhanced.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Next, preferred embodiments according to the present invention will be explained in conjunction with the accompanying drawings.

First Embodiment

Figure 1A:
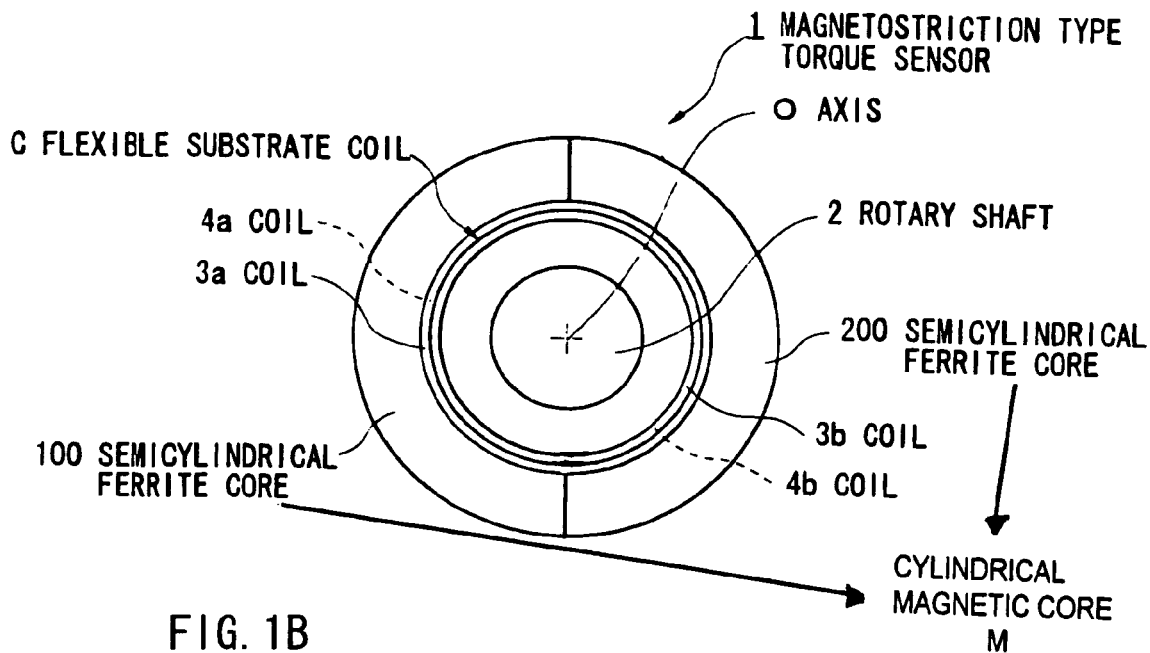
FIG. 1A is a front view schematically showing a magnetostrictive torque sensor in a first preferred embodiment according to the invention.
Figure 1B:
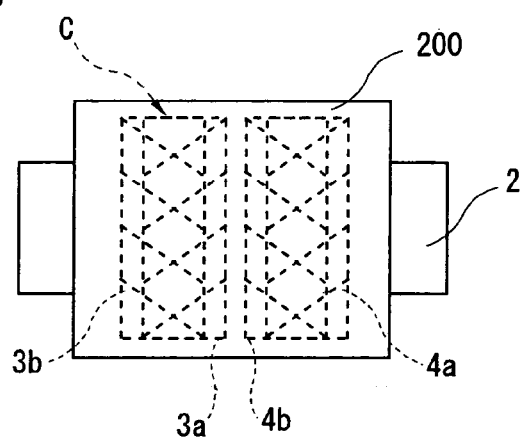
FIG. 1B is a side view schematically showing the magnetostrictive torque sensor.
Figure 1C:
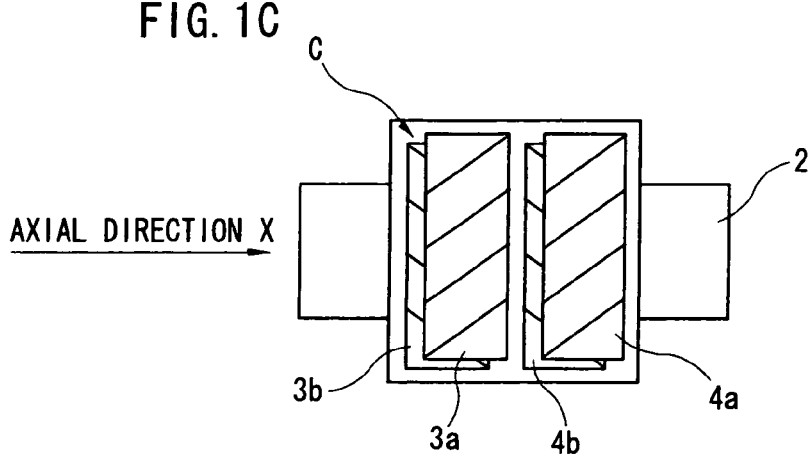
FIG. 1C is a side view schematically showing the magnetostrictive torque sensor with its magnetic core removed.
Figure 2:
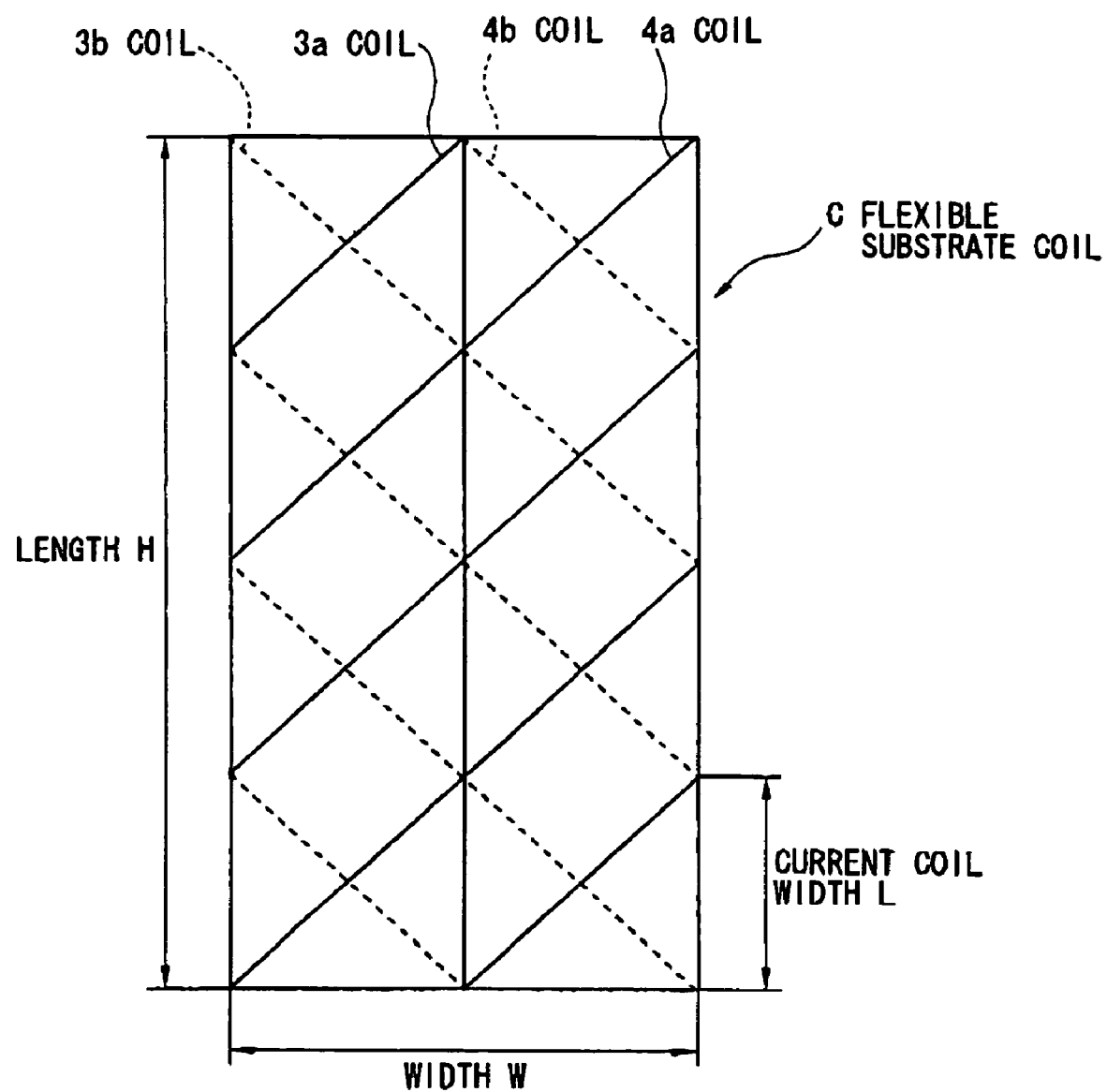
FIG. 2 is a development view showing a flexible substrate coil of the magnetostrictive torque sensor of the first embodiment.
Figure 3:
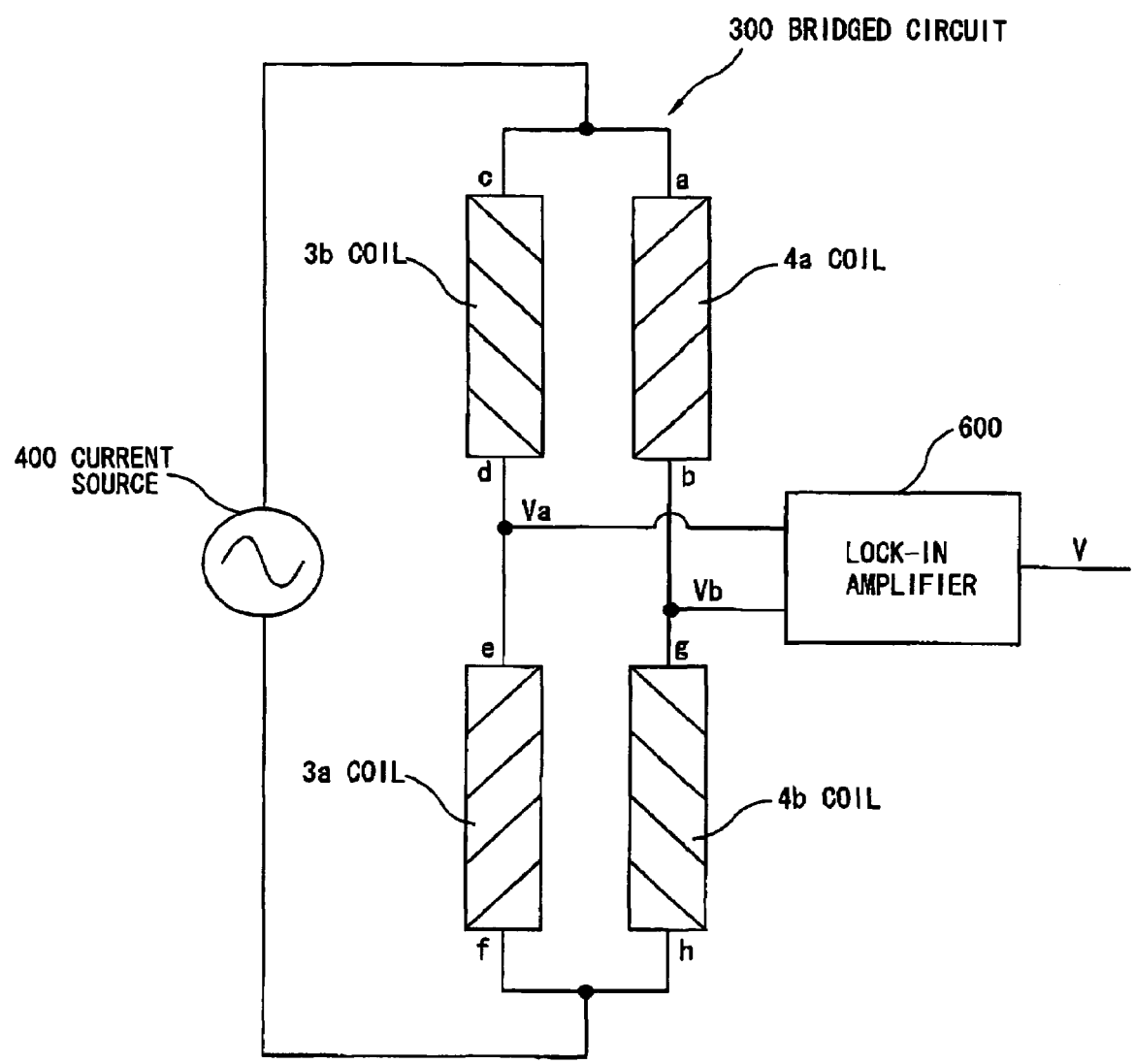
FIG. 3 is a circuit diagram showing the magnetostrictive torque sensor of the first embodiment.

FIG. 1A is a front view schematically showing a magnetostrictive torque sensor in the first preferred embodiment according to the invention. FIG. 1B is a side view schematically showing the magnetostrictive torque sensor. FIG. 1C is a side view schematically showing the magnetostrictive torque sensor with its magnetic core removed. FIG. 2 is a development view showing a flexible substrate coil of the magnetostrictive torque sensor of the first embodiment. FIG. 3 is a circuit diagram showing the magnetostrictive torque sensor of the first embodiment.

Construction of Magnetostrictive Torque Sensor

As shown in FIGS. 1A to 3, a magnetostrictive torque sensor 1 comprises: a rotating shaft 2 having magnetostrictive characteristics; two semi-cylindrical ferrite cores 100, 200 on the inner circumference of which a flexible substrate coil C is disposed, the flexible substrate coil C comprising torque detection coils 3a, 4a inclined at an angle of +45° to the center axis O and torque detection coils 3b, 4b inclined at an angle of −45° to the center axis O; a current source 400 to supply a voltage to a bridged circuit 300 formed by connecting the detection coils 3a, 3b, 4a, and 4b disposed in the semi-cylindrical ferrite cores 100, 200; and a lock-in amplifier 600 to detect a differential signal outputted from the bridged circuit 300.

Rotating Shaft

The rotating shaft 2 is shaped like a cylindrical column and is formed of a metal having magnetostrictive characteristics, for example, Ni, Fe—Al alloy, Fe—Co alloy etc.

Semi-Cylindrical Ferrite Core

As shown in FIG. 1, the semi-cylindrical ferrite cores 100, 200 are disposed at a predetermined clearance from the outer periphery of the rotating shaft 2 and in close contact with each other such that a cylindrical magnetic core M is formed. The magnetic core M is disposed around the center axis O and is as a whole made of a member having a high magnetic permeability (preferably, a magnetic permeability of μ>100) and a low electric conductivity (preferably, an electric conductivity of σ=$10^4$–$10^5$ S/m). A flexible substrate coil C is disposed on the whole inner periphery of the magnetic core M.

As shown in FIG. 2, a width W of the flexible substrate coil C (W is equal to a width of the semi-cylindrical ferrite cores 100, 200) is represented by the following formula:

$$W=\pi D/2N (N=1, 2, 3, \ldots)$$

where D is an inner diameter of the semi-cylindrical ferrite cores 100, 200 (which correspond to the cylindrical magnetic core).

A coil length H of the flexible substrate coil C and a current coil width L thereof are represented by the following formulas, respectively:

$$H=\pi D, L=W/2=\pi D/4N (N=1, 2, 3, \ldots)$$

For example, when N=1, H=πD, W=πD/2 and L=πD/4 are obtained thereby.

Meanwhile, explanation for the method of forming the flexible substrate coil C is omitted herein since the method is almost the same as the forming method described in JP-A-2005-164531, the contents of which are incorporated herein.

The coils 3a, 3b are disposed on one side of the flexible substrate coil C in the direction of the center axis and disposed in the entire circumferential direction. The coil 3a is disposed at a position near the inner periphery of the semi-cylindrical ferrite cores 100, 200, and the coil 3b is disposed at a position near the outer periphery of the rotating shaft 2. The coils 4a, 4b are disposed on the other side of the flexible substrate coil C in the direction of the center axis and disposed in the entire circumferential direction. The coil 4a is disposed at a position near the inner periphery of the semi-cylindrical ferrite cores 100, 200, and the coil 4b is disposed at a position near the outer periphery of the rotating shaft 2.

Current Source

As shown in FIG. 3, a current source 400 comprises an alternating-current source (a high-frequency oscillator) which supplies a voltage to the input terminal of a bridged circuit 300. One terminal of the current source 400 is connected to a terminal c of the coil 3b and a terminal a of the coil 4a, and the other terminal of the current source 400 is connected to a terminal f of the coil 3a and a terminal h of the coil 4b. The bridged circuit 300 comprises four coils 3a, 3b, 4a, and 4b. The input terminal of the coils 4a, 3b is defined as a first input terminal, and the input terminal of the coils 3a, 4b is defined as a second input terminal. Further, a terminal d of the coil 3b is connected to a terminal e of the coil 3a, and a terminal b of the coil 4a is connected to a terminal g of the coil 4b so that the output terminals of the coils 3a, 3b and the coils 4a, 4b are defined as a first output terminal and a second output terminal, respectively.

Figure 4:
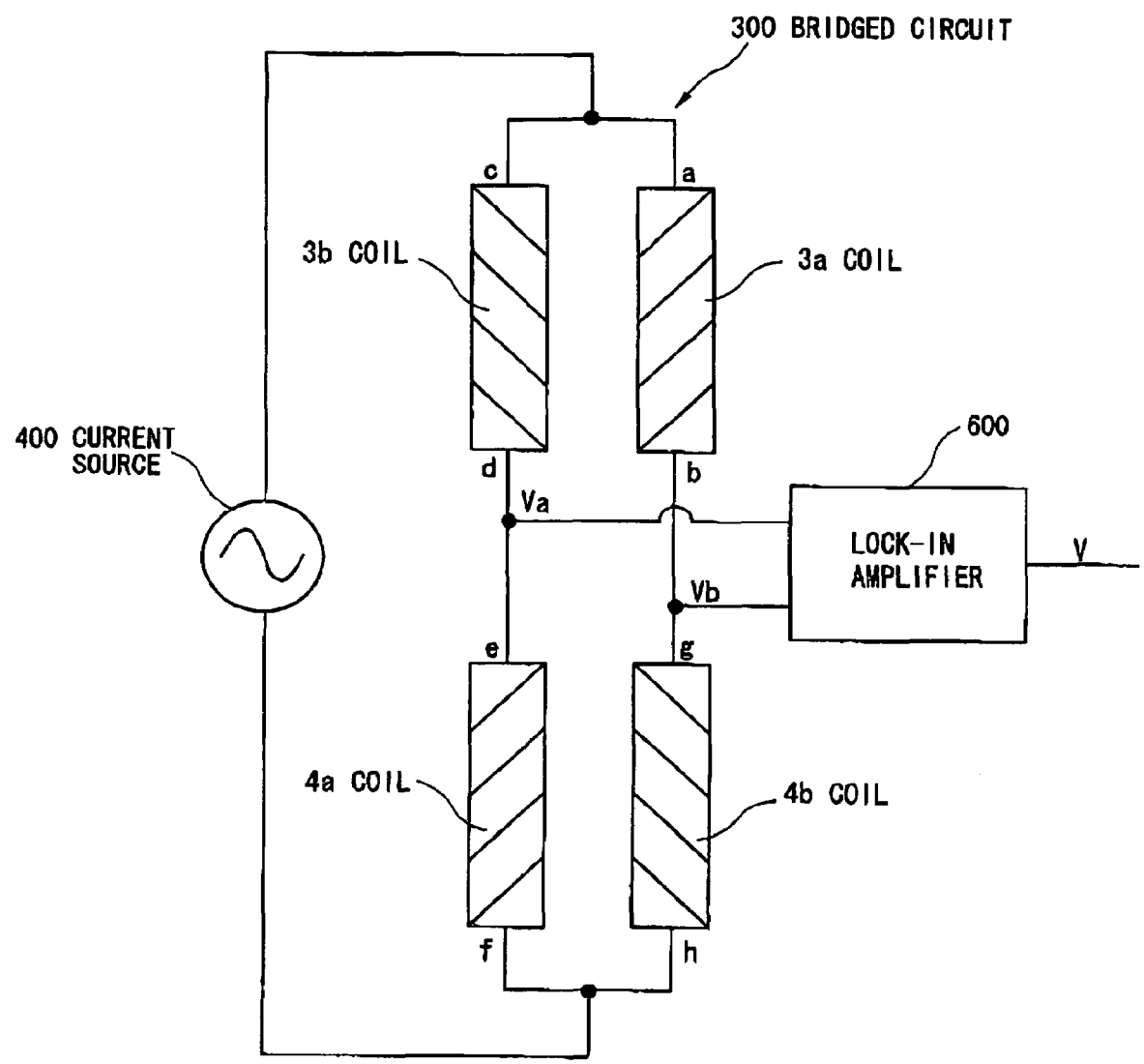
FIG. 4 is a circuit diagram showing a modification of a bridged circuit in the magnetostrictive torque sensor of the first embodiment.

Alternatively, as shown in FIG. 4, the bridged circuit 300 may be composed such that a terminal d of the coil 3b is connected to a terminal e of the coil 4a, and a terminal b of the coil 3a is connected to a terminal g of the coil 4b. In this case, one terminal of the current source 400 is connected to a terminal c of the coil 3b and a terminal a of the coil 3a, and the other terminal of the current source 400 is connected to a terminal f of the coil 4a and a terminal h of the coil 4b. Further, the input terminals of the coils 3a, 3b and the coils 4a, 4b are defined as a first input terminal and a second input terminal, respectively, and the output terminals of the coils 4a, 3b and the coils 3a, 4b are defined as a first output terminal and a second output terminal, respectively.

Lock-in Amplifier

As shown in FIG. 3, a lock-in amplifier 600 is connected to both of the output terminals of the bridged circuit 300 so as to detect a differential signal generated from the bridged circuit 300 as described earlier.

Detection Principle of the Magnetostrictive Torque Sensor

A detection principle of the magnetostrictive torque sensor in the first embodiment will be explained below.

As shown in FIG. 3, a high frequency current generated from the current source 400 flows in the terminal c of the coil 3b and the terminal a of the coil 4a, and flows out from the terminal f of the coil 3a and the terminal h of the coil 4b.

At this moment, when a positive torque is applied to the rotating shaft 2, the inductance of the coils 3b, 4b increases and the inductance of the coil 3a, 4a decreases so that the output of the lock-in amplifier 600 increases in the positive direction. On the other hand, when a negative torque is applied to the rotating shaft 2, the inductance of the coils 3b, 4b decreases and the inductance of the coil 3a, 4a increases so that the output of the lock-in amplifier 600 decreases in the negative direction. Thus, the direction and magnitude of the torque applied to the rotating shaft 2 can be detected.

Advantages of the First Embodiment

The following advantages can be obtained by the first preferred embodiment.

(1) The detecting regions of the coils 3a, 3b, 4a and 4b remain unchanged so that a change in sensor output depending on the rotation angle of the rotating shaft can be suppressed to enhance reliability of the torque detection.

(2) The detection coils comprise the flexible substrate coil C so that the detection coils can be easily attached to the semi-cylindrical ferrite cores 100, 200.

Figure 5:
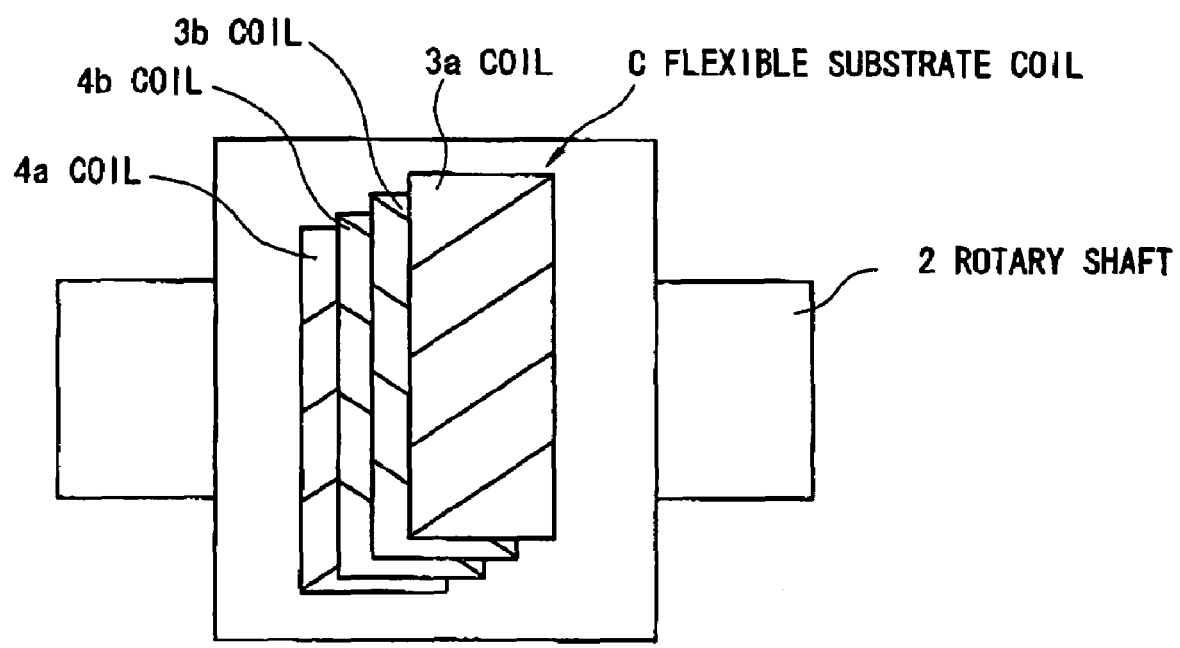
FIG. 5 is a side view showing a modification of a coil disposition in the magnetostrictive torque sensor in the first embodiment.

Although this embodiment is constructed such that the coils 3a, 4a and the coils 3b, 4b each are juxtaposed to each other along the center axis O, the invention is not limited to this composition. As shown in FIG. 5, the coils 3a, 3b, 4a and 4b may be stacked around the rotating shaft 2 so that the same effect as the above embodiment can be obtained. In this case, the coils 3b, 4b are disposed between the coil 3a and the coil 4a.

Second Embodiment

Figure 6A:
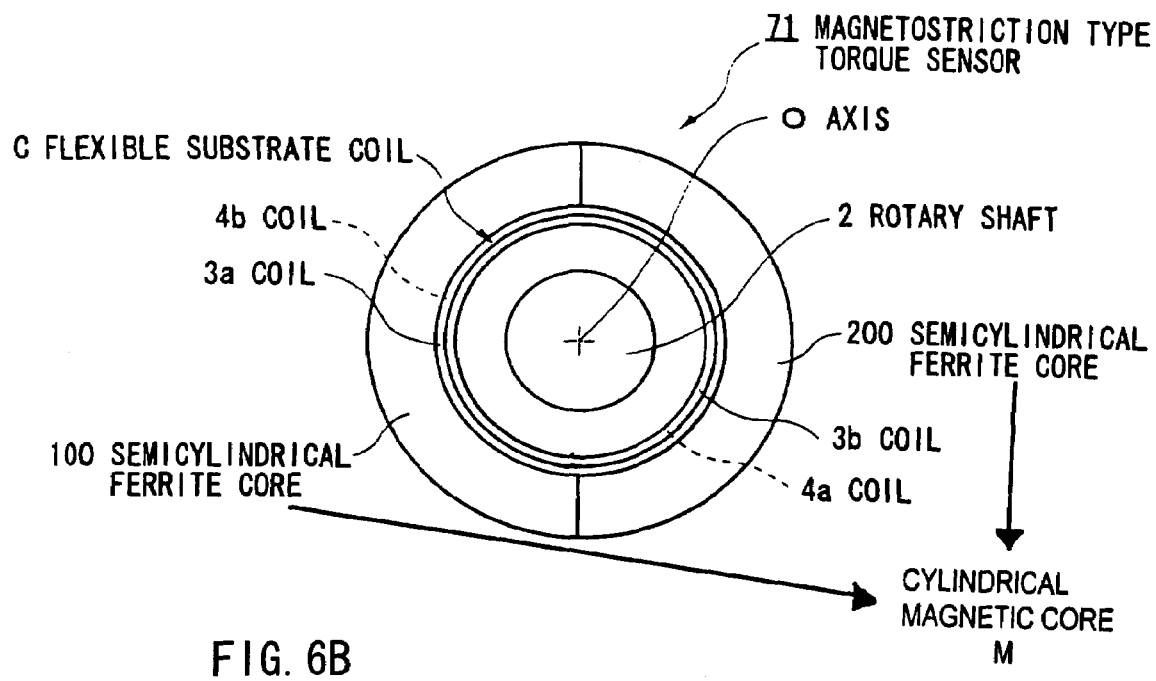
FIG. 6A is a front view schematically showing a magnetostrictive torque sensor in a second preferred embodiment according to the invention.
Figure 6B:
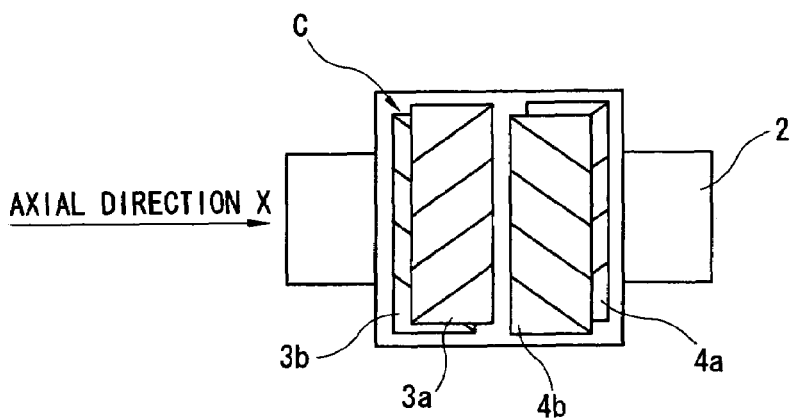
FIG. 6B is a side view schematically showing the magnetostrictive torque sensor in the second preferred embodiment according to the invention.
Figure 7:
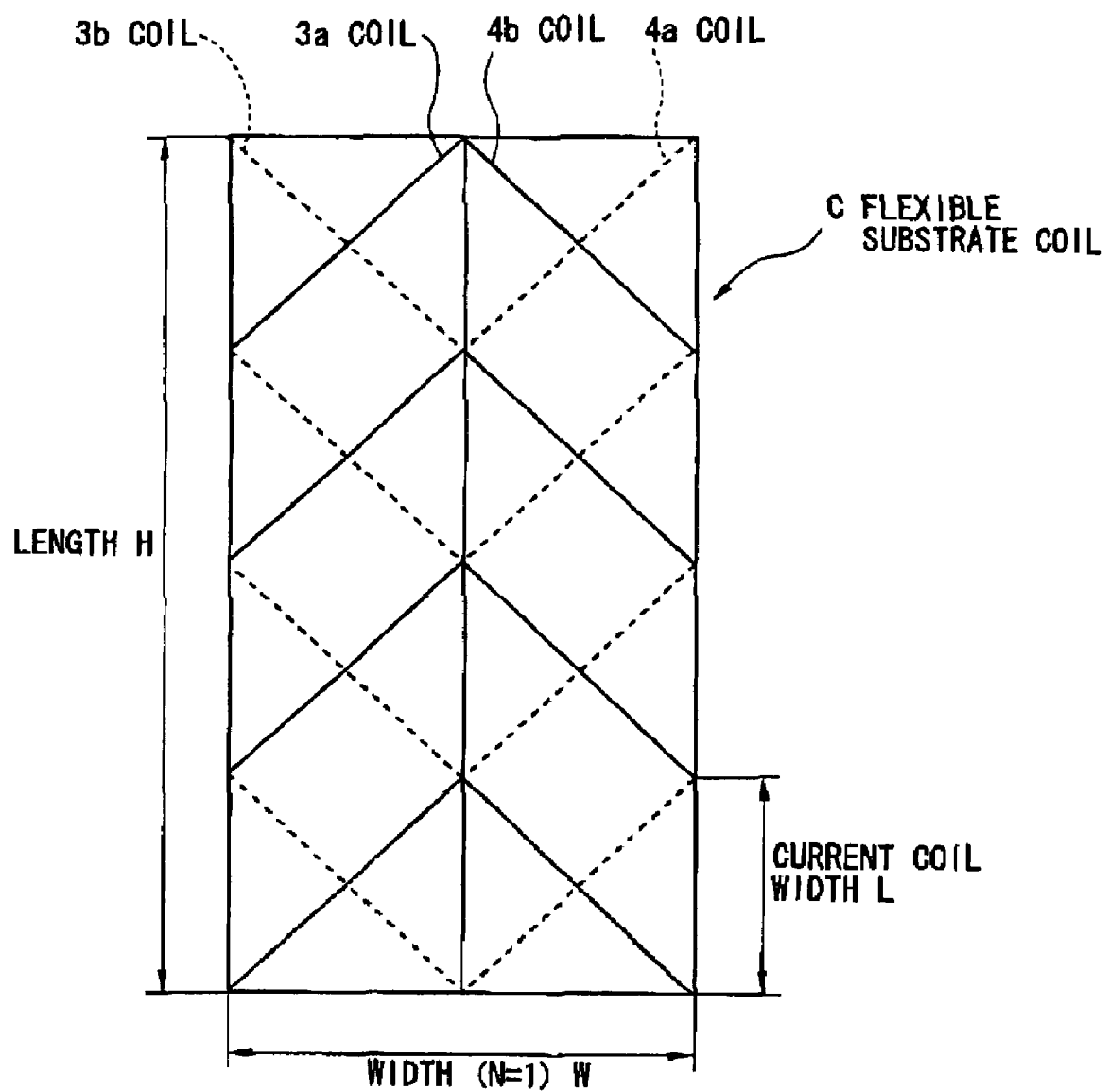
FIG. 7 is a development view showing a flexible substrate coil of the magnetostrictive torque sensor in the second preferred embodiment according to the invention.

FIG. 6A is a front view schematically showing a magnetostrictive torque sensor in the second preferred embodiment according to the invention. FIG. 6B is a side view schematically showing the magnetostrictive torque sensor in the second embodiment. FIG. 7 is a development view showing a flexible substrate coil of the magnetostrictive torque sensor in the second embodiment. In FIGS. 6A, 6B and 7, like components are indicated by using the same numerals as in FIGS. 1 and 2, and the detailed explanation is omitted.

As shown in FIGS. 6A and 6B, a magnetostrictive torque sensor 71 of the second embodiment has the features that one of the coils 3a, 4a is disposed on the side of the rotating shaft 2 and the other of the coils 3a, 4a is disposed on the side of the magnetic core, and one of the coils 3b, 4b is disposed on the side of the rotating shaft 2 and the other of the coils 3b, 4b is disposed on the side of the magnetic core.

Thus, the coils 3a, 4a are juxtaposed to each other along the center axis O and disposed at positions near the semi-cylindrical ferrite cores 100, 200 and the rotating shaft 2, respectively. Also, the coils 3b, 4b are juxtaposed to each other along the center axis O and disposed at positions near the semi-cylindrical ferrite cores 100, 200 and the rotating shaft 2, respectively.

As shown in FIG. 7, a width W of the flexible substrate coil C (W is equal to a width of the semi-cylindrical ferrite cores 100, 200) is represented by the following formula:

$$W=\pi D/2N (N=1, 2, 3, \ldots)$$

wherein D is an inner diameter of the semi-cylindrical ferrite cores 100, 200 (which correspond to the cylindrical magnetic core).

A length H of the flexible substrate coil C and a current coil width L are represented by the following formulae, respectively:

$$H=\pi D, L=W/2=\pi D/4N (N=1, 2, 3, \ldots)$$

For example, when N=1, H=πD, W=πD/2 and L=πD/4 are obtained.

Advantages of the Second Embodiment

By the second embodiment, the same advantages (1) and (2) as the first embodiment can be obtained.

Third Embodiment

Figure 8A:
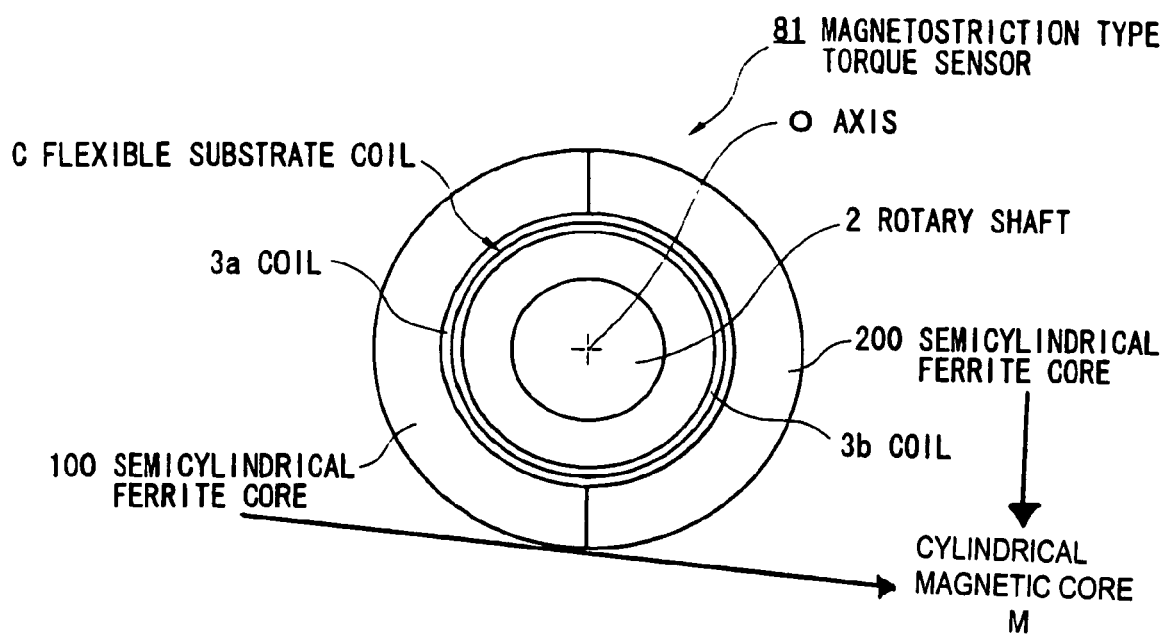
FIG. 8A is a front view schematically showing a magnetostrictive torque sensor in a third preferred embodiment according to the invention.
Figure 8B:
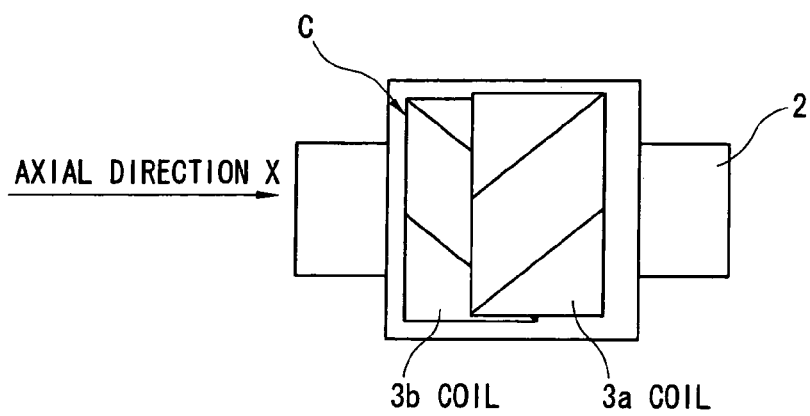
FIG. 8B is a side view schematically showing the magnetostrictive torque sensor in the third preferred embodiment according to the invention.
Figure 9:
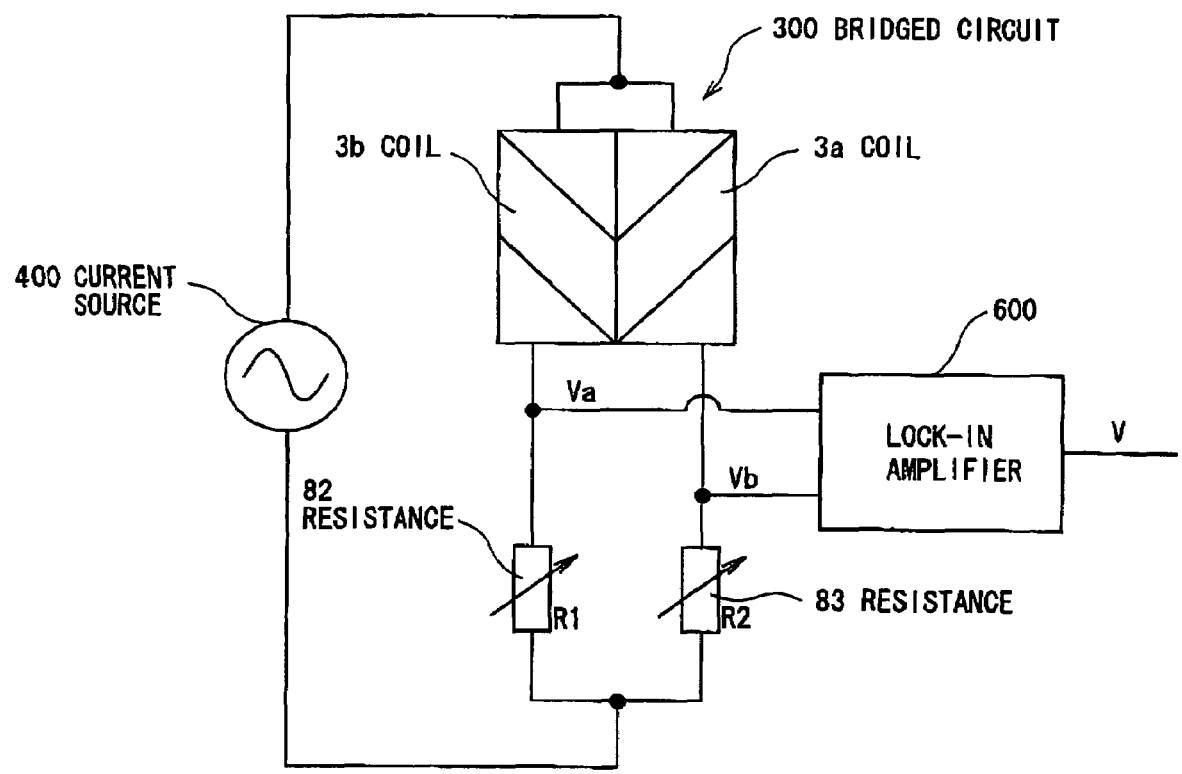
FIG. 9 is a circuit diagram showing the magnetostrictive torque sensor in the third preferred embodiment according to the invention.
Figure 10:
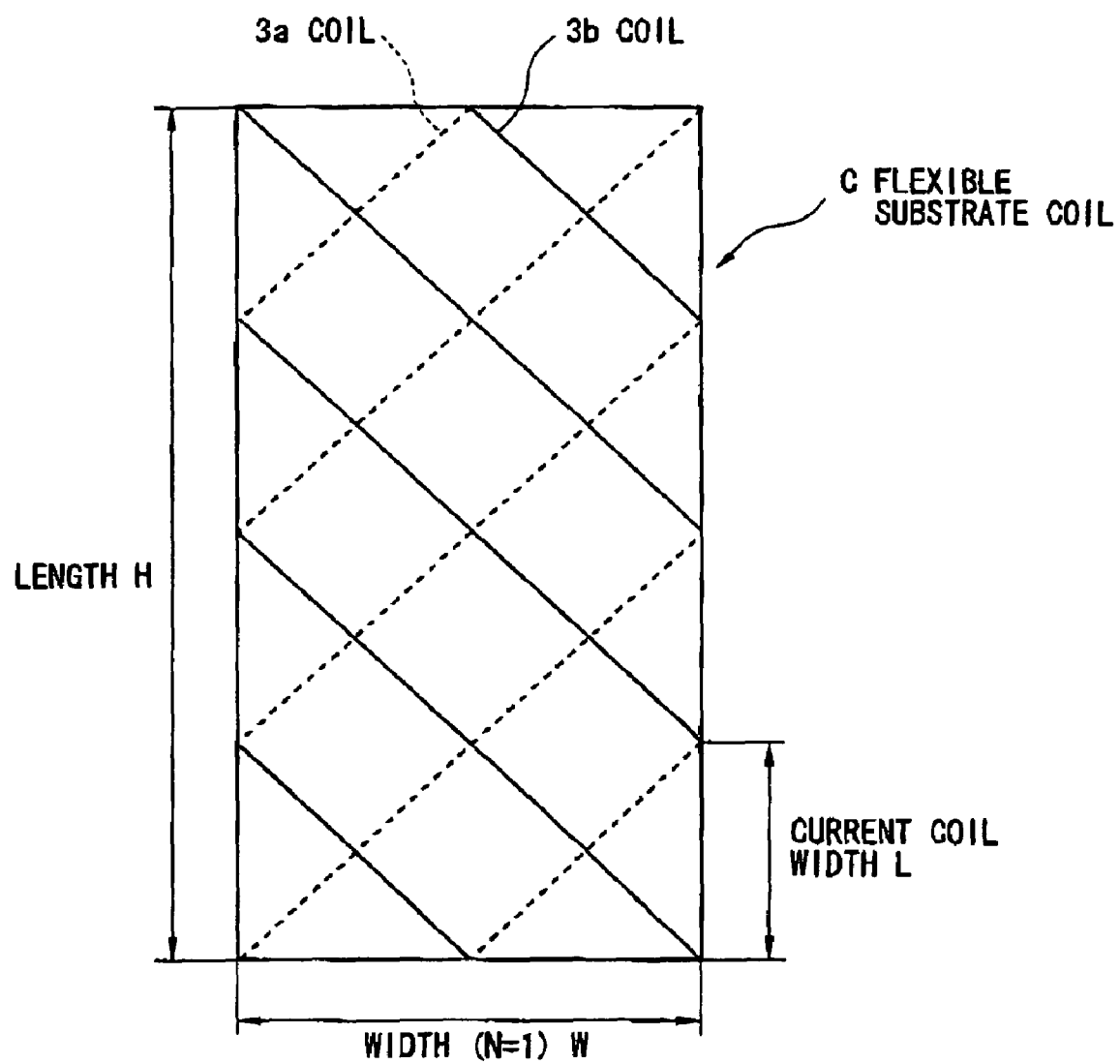
FIG. 10 is a development view showing a flexible substrate coil of the magnetostrictive torque sensor in the third preferred embodiment according to the invention.

FIG. 8A is a front view schematically showing a magnetostrictive torque sensor in the third preferred embodiment according to the invention. FIG. 8B is a side view schematically showing the magnetostrictive torque sensor in the third embodiment. FIG. 9 is a circuit diagram showing the magnetostrictive torque sensor in the third embodiment. FIG. 10 is a development view showing a flexible substrate coil of the magnetostrictive torque sensor in the third embodiment. In FIGS. 8A to 10, like components are indicated by using the same numerals as in FIGS. 1 to 3, and the detailed explanation is omitted.

As shown in FIGS. 8A and 8B, a magnetostrictive torque sensor 81 of the third embodiment has the features that the sensor 81 comprises a bridged circuit 300 having coils 3a, 3b and resistances 82, 83.

Therefore, as shown in FIGS. 8A to 9, the coil 3b is connected to the resistance 82 and disposed at a position near the outer periphery of the rotating shaft 2. The coil 3a is connected to the resistance 83 and disposed at a position near the inner periphery of the semi-cylindrical ferrite cores 100, 200.

Although in this embodiment the coil 3b is disposed on the side of the rotating shaft 2 and the coil 3a is disposed on the side of the semi-cylindrical ferrite cores 100, 200, alternatively, the coil 3b may be disposed on the side of the semi-cylindrical ferrite cores 100, 200 and the coil 3a may be disposed on the side of the rotating shaft 2.

As shown in FIG. 10, a width W of the flexible substrate coil C (W is equal to a width of the semi-cylindrical ferrite cores 100, 200) is represented by the following formula:

$$W=\pi D/2N (N=1, 2, 3, \ldots)$$

where D is an inner diameter of the semi-cylindrical ferrite cores 100, 200 (which correspond to the cylindrical magnetic core).

A length H of the flexible substrate coil C and a current coil width L are represented by the following formulae, respectively:

$$H=\pi D, L=W/2=\pi D/4N (N=1, 2, 3, \ldots)$$

For example, when N=1, H=πD, W=πD/2 and L=πD/4 are obtained.

Advantages of the Third Embodiment

The following advantages can be obtained by the third embodiment in addition to the advantages (1) and (2) of the first embodiment.

The bridged circuit 300 is well balanced by adjusting the resistances 82, 83 so that, when no torque is applied to the rotating shaft 2, the input terminal power voltage Va−Vb of the lock-in amplifier 600 can be set to be V−Vb=0. Thus, the amplification factor of the lock-in amplifier 600 can be increased to enhance the torque detection sensitivity.

Fourth Embodiment

Figure 11:
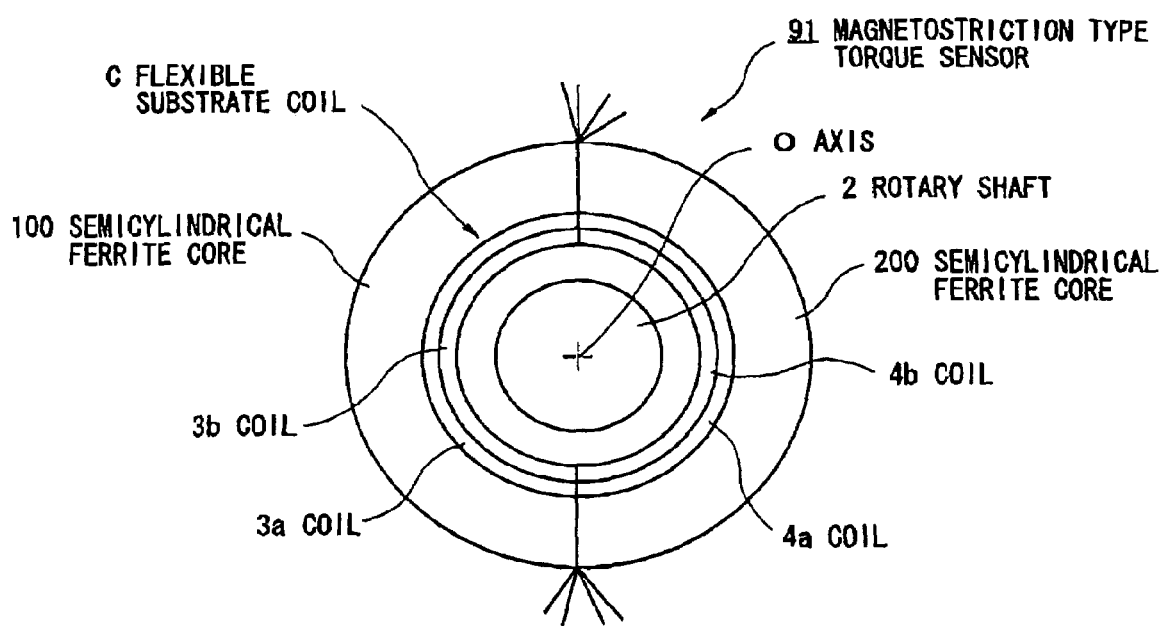
FIG. 11 is a front view schematically showing a magnetostrictive torque sensor in a fourth preferred embodiment according to the invention.
Figure 12:
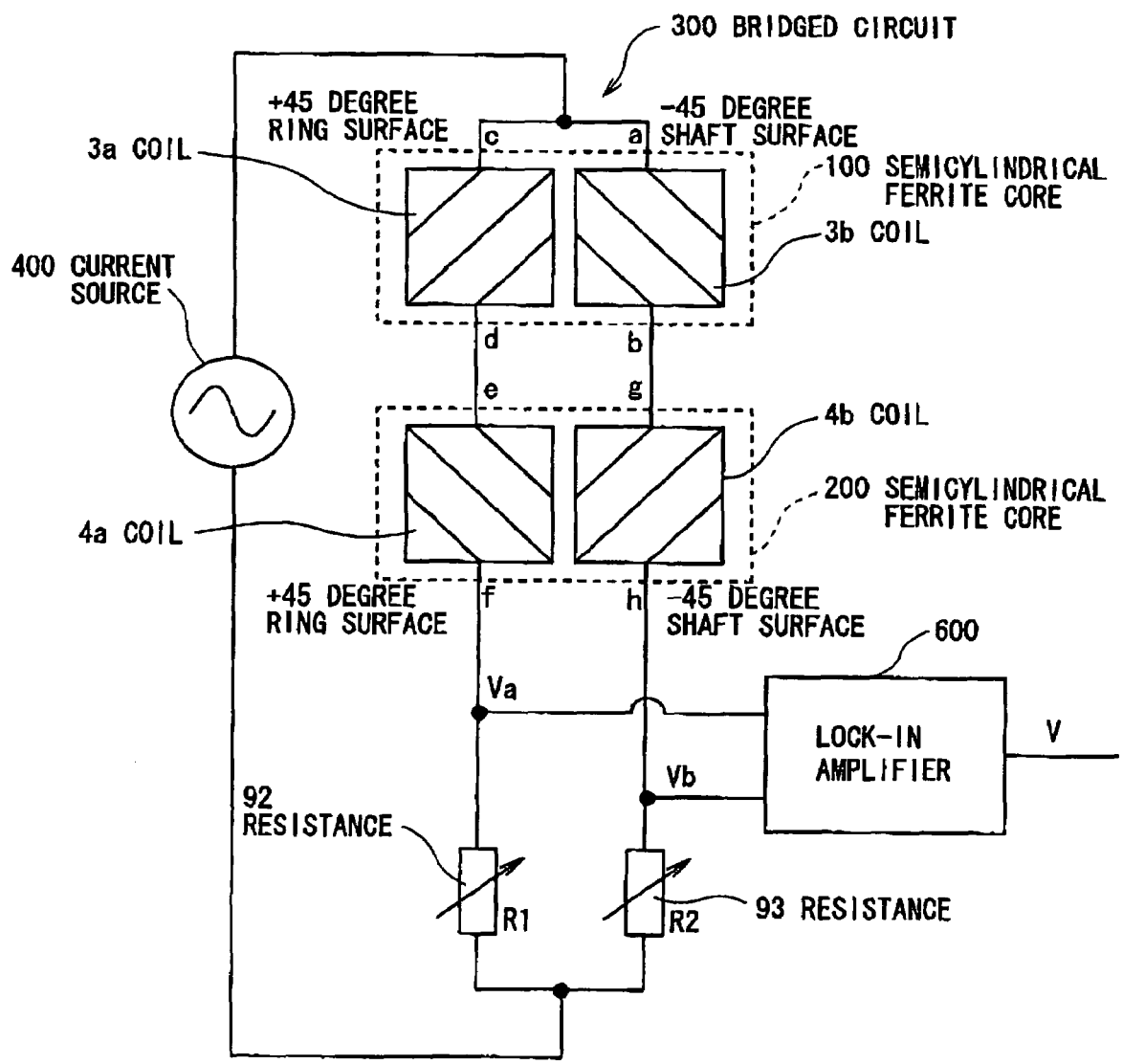
FIG. 12 is a circuit diagram showing the magnetostrictive torque sensor in the fourth preferred embodiment according to the invention.
Figure 13:
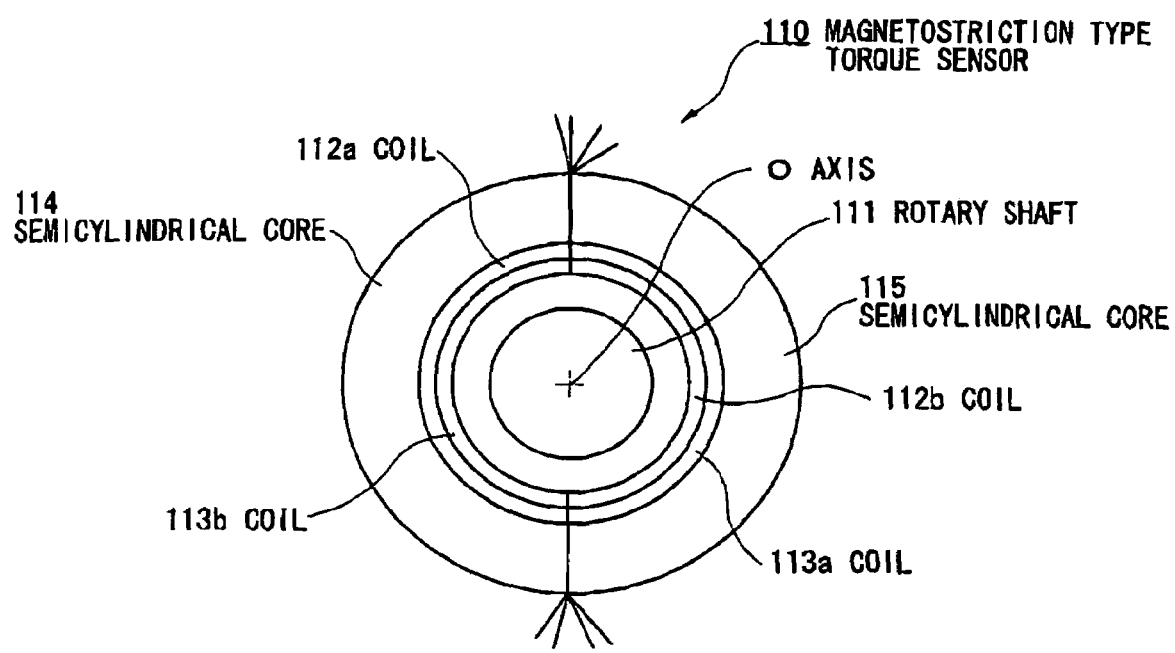
FIG. 13 is a front view schematically showing a conventional magnetostrictive torque sensor.
Figure 14:
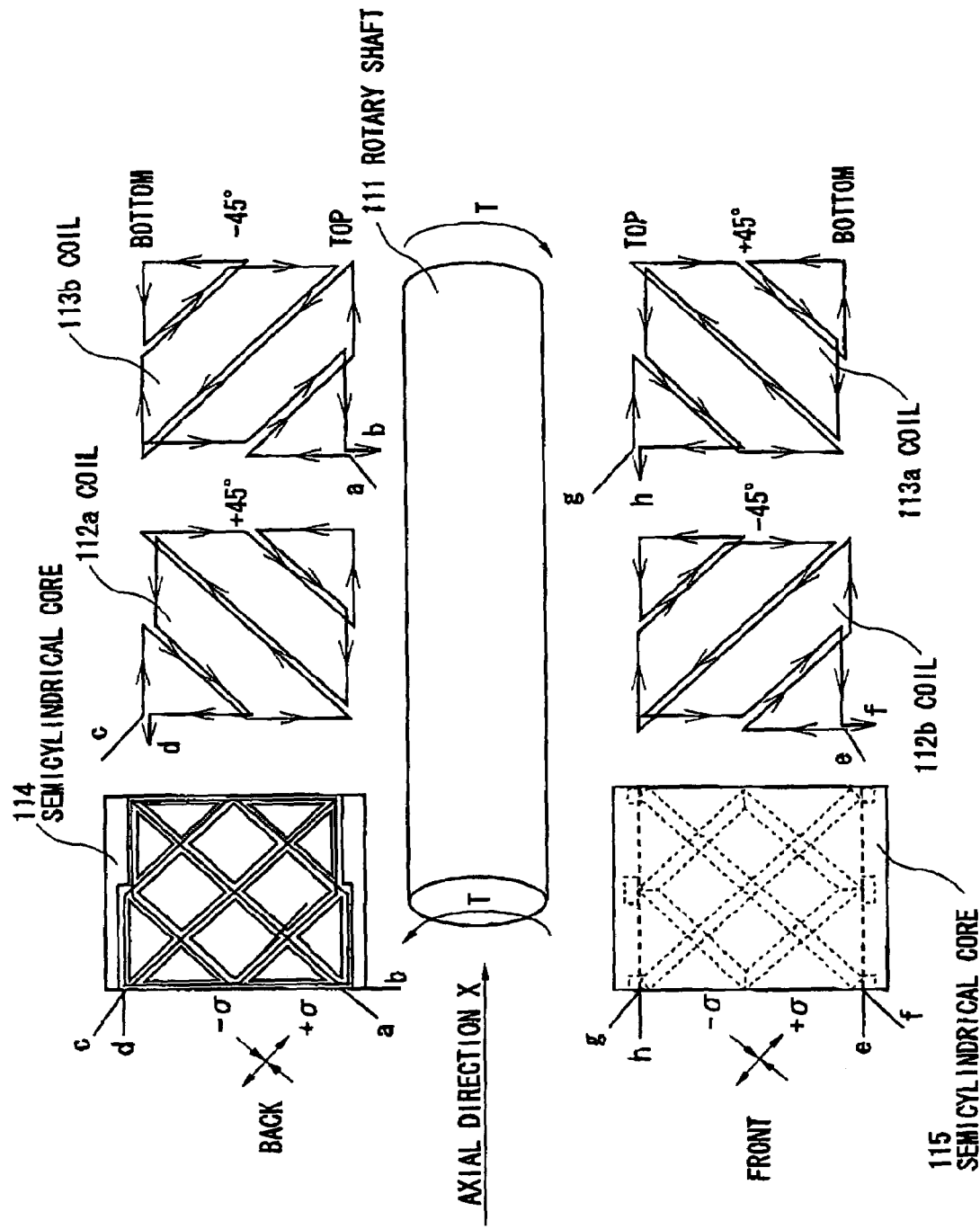
FIG. 14 is a side view schematically showing operating principle of the conventional magnetostrictive torque sensor.
Figure 15:
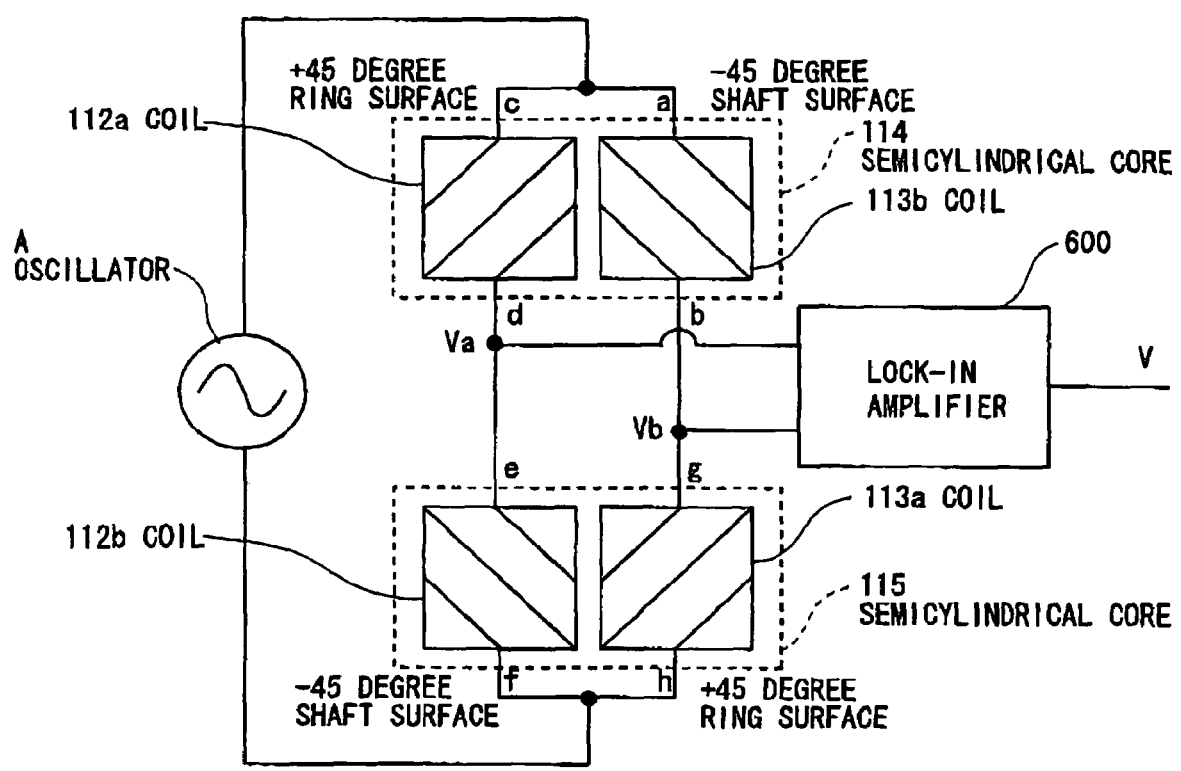
FIG. 15 is a circuit diagram showing a detecting circuit of the conventional magnetostrictive torque sensor.

FIG. 11 is a front view schematically showing a magnetostrictive torque sensor in the fourth preferred embodiment according to the invention. FIG. 12 is a circuit diagram showing the magnetostrictive torque sensor in the fourth embodiment. In FIGS. 11 and 12, like components are indicated by using the same numerals as in FIGS. 1 to 3, and the detailed explanation is omitted.

As shown in FIGS. 11 and 12, the magnetostrictive torque sensor 91 of the fourth embodiment has the features that coils 3a, 3b are disposed on the inner periphery of the semi-cylindrical ferrite core 100 and coils 4a, 4b are disposed on the inner periphery of the semi-cylindrical ferrite core 200, and resistances 92, 93 are connected to the coils 3a, 3b, 4a and 4b to compose a bridged circuit 300.

Thus, on the inner periphery of the semi-cylindrical ferrite cores 100, 200 (which correspond to the cylindrical magnetic core), the coil 3a and the coil 4a are connected together and the coil 3b and the coil 4b are connected together, so that the flexible substrate coil C can be formed on the entire circumferential direction. The resistances 92, 93 are connected to the coils 4a and 4b, respectively, of the flexible substrate coil C.

Advantages of the Fourth Embodiment

The following advantages can be obtained by the fourth embodiment in addition to the advantages (1) and (2) of the first preferred embodiment, The bridged circuit 300 is well balanced by adjusting the resistances 92, 93 so that, when no torque is applied to the rotating shaft 2, the input terminal power voltage Va–Vb of the lock-in amplifier 600 can be set to be V–Vb=0. Thus, the amplification factor of the lock-in amplifier 600 can be increased to enhance the torque detection sensitivity.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A magnetostrictive torque sensor, comprising:
a rotating shaft to rotate around a center axis, the rotating shaft comprising magnetostrictive characteristics;
a cylindrical magnetic core formed around said center axis at a predetermined distance from an outer periphery of the rotating shaft;
a flexible substrate coil disposed on an entire inner periphery of the cylindrical magnetic core such that said flexible substrate coil has a width in an axial direction that is equal to a width in the axial direction of said cylindrical magnetic core, the flexible substrate coil comprising:
a first cylindrical detection coil layer formed on and occupying the entire inner periphery of the cylindrical magnetic core; and
a second cylindrical detection coil layer formed on and occupying an entire inner periphery of said first cylindrical detection coil layer such that said outer periphery of said rotating shaft is nearer to said second cylindrical detection coil layer than said first cylindrical detection coil layer; and
a bridged circuit comprising said first and second cylindrical detection coil layers,
wherein a circumference of an outer surface of the flexible substrate coil and a circumference of an outer surface of the first cylindrical detection coil layer is equal to a circumference of the entire inner periphery of the cylindrical magnetic core.

2. The magnetostrictive torque sensor according to claim 1, wherein said first cylindrical detection coil layer comprises a pair of first detection coils comprising:
a first one of said pair of first detection coils formed on and occupying a first half region of said entire inner periphery of said cylindrical magnetic core; and
a second one of said pair of first detection coils formed on and occupying a second half region of said entire inner periphery of said cylindrical magnetic core,
wherein said second cylindrical detection layer comprises a pair of second detection coils comprising:
a first one of said pair of second detection coils formed on and occupying a first half region of said entire inner periphery of said first cylindrical detection coil layer; and
a second one of said pair of second detection coils formed on and occupying a second half region of said entire inner periphery of said first cylindrical detection coil layer,
wherein said first half region and second half region of said entire inner periphery of said cylindrical magnetic core respectively correspond to said first half region and said second half region of said entire inner periphery of said first cylindrical detection coil layer,
wherein said pair of first detection coils is inclined at an angle of +45° to the center axis, and
wherein said pair of second detection coils is inclined at an angle of −45° to the center axis.

3. The magnetostrictive torque sensor according to claim 2, wherein the first one of said pair of first detection coils is connected to said first one of said pair of said second detection coils,
wherein the second one of said pair of first detection coils is connected to said second one of said pair of second detection coils, and
wherein said pair of first detection coils forms a first inductance and said pair of second detection coils forms a second inductance.

4. The magnetostrictive torque sensor according to claim 2, wherein the first one of said pair of first detection coils is connected to the second one of said pair of second detection coils,
wherein the second one of said pair of first detection coils is connected to the first one of said pair of second detection coils, and
wherein said pair of first detection coils forms a first inductance and said pair of second detection coils forms a second inductance.

5. The magnetostrictive torque sensor according to claim 1, wherein said first cylindrical detection coil layer comprises a pair of first detection coils comprising:
a first one of said pair of first detection coils formed on and occupying a first half portion of said entire inner periphery of said cylindrical magnetic core; and
a second one of said pair of first detection coils formed on and occupying a second half portion of said entire inner periphery of said cylindrical magnetic core,
wherein said second cylindrical detection layer comprises a pair of second detection coils comprising:
a first one of said pair of second detection coils formed on and occupying a first half portion of said entire inner periphery of said first cylindrical detection coil layer; and
a second one of said pair of second detection coils formed on and occupying a second half portion of said entire inner periphery of said first cylindrical detection coil layer,
wherein said first half region and second half region of said entire inner periphery of said cylindrical magnetic core respectively correspond to said first half region and said second half region of said entire inner periphery of said first cylindrical detection coil layer,
wherein said first one of said pair of first detection coils and said second one of said pair of second detection coils are inclined at an angle of +45° to the center axis, and wherein said first one of said pair of second detection coils and said second one of said pair of first detection coils are inclined at an angle of −45° to the center axis.

6. The magnetostrictive torque sensor according to claim 5, wherein the first one of the pair of first detection coils is connected to the first one of the pair of second detection coils,
wherein the second one of the pair of first detection coils is connected to the second one of said pair of second detection coils, and
wherein said pair of first detection coils forms a first inductance and said pair of second detection coils forms a second inductance.

7. The magnetostrictive torque sensor according to claim 5, wherein the first one of said pair of first detection coils is connected to the second one of said pair of second detection coils,
wherein the second one of said pair of first detection coils is connected to the first one of said pair of second detection coils, and
wherein said pair of first detection coils form a first inductance and said pair of second detection coils form a second inductance.

8. The magnetostrictive torque sensor according to claim 1, wherein the first cylindrical detection coil layer comprises a coil inclined at an angle of +45° to the center axis, and
wherein the second cylindrical detection coil layer comprises a coil inclined at an angle of −45° to the center axis.

9. The magnetostrictive torque sensor according to claim 8, wherein the coil of the second cylindrical detection coil layer is connected to a first resistance,
wherein the coil of the first cylindrical detection coil layer is connected to a second resistance,
wherein the coil of the first cylindrical detection coil layer and said first resistance form a first inductance, and
wherein the coil of the second cylindrical detection coil layer and said second resistance form a second inductance.

10. The magnetostrictive torque sensor according to claim 1, wherein the bridged circuit comprises a resistance.

11. The magnetostrictive torque sensor according to claim 1, wherein the length of the flexible substrate coil is a product of an inner diameter of the cylindrical magnetic core and π.

12. The magnetostrictive torque sensor according to claim 1, wherein said cylindrical magnetic core comprises a member having a magnetic permeability at least larger than 100 and an electric conductivity in a range of $10^4$ S/m to $10^5$ S/m.

13. The magnetostrictive torque sensor according to claim 1, wherein said flexible substrate coil further comprises:
a third cylindrical detection coil layer formed on and occupying an entire inner periphery of said second cylindrical detection coil layer such that said outer periphery of said rotating shaft is nearer to said third cylindrical detection coil layer than said second cylindrical detection coil layer; and
a fourth cylindrical detection coil layer formed on an occupying an entire inner periphery of said third cylindrical detection coil layer such that said outer periphery of said rotating shaft is nearer to said fourth cylindrical detection coil layer than said third cylindrical detection coil layer.

14. The magnetostrictive torque sensor according to claim 13, wherein said first cylindrical detection coil layer and said fourth cylindrical detection coil layer are inclined at an angle of +45° to the center axis, and
wherein said second cylindrical detection coil layer and said third cylindrical detection coil layer are inclined at an angle of −45° to the center axis.

15. The magnetostrictive torque sensor according to claim 1, wherein the second cylindrical detection coil layer comprises a coil inclined at an angle of +45° to the center axis, and
wherein the first cylindrical detection coil layer comprises a coil inclined at an angle of −45° to the center axis.

16. The magnetostrictive torque sensor according to claim 1, wherein the cylindrical magnetic core comprises a pair of semi-cylindrical ferrite cores contacting each other such that said cylindrical magnetic core is formed, said pair of semi-cylindrical ferrite cores disposed at said predetermined distance from said outer periphery of said rotating shaft, and
wherein said flexible substrate core is disposed on an entire inner periphery of said pair of semi-cylindrical ferrite cores.

17. A magnetostrictive torque sensor according to claim 16, wherein said first cylindrical coil layer comprises a pair of first semi-cylindrical coil layers formed on and occupying said entire inner periphery of said pair of semi-cylindrical ferrite cores, and
wherein said second cylindrical coil layer comprises a pair of second semi-cylindrical coil layers formed on an occupying an entire inner periphery of said pair of first semi-cylindrical coil layers such that said outer periphery of said rotating shaft is nearer to said pair of second semi-cylindrical coil layers than said pair of first semi-cylindrical coil layers.

18. A magnetostrictive torque sensor according to claim 17, wherein said pair of first semi-cylindrical coil layers comprises coils inclined at an angle of +45° to the center axis, and
wherein said pair of second semi-cylindrical coil layers comprises coils inclined at an angle of −45° to the center axis.

19. A magnetostrictive torque sensor according to claim 18, wherein said coils of said pair of first semi-cylindrical coil layers are connected to each other and to a first resistance, and
wherein said coils of said pair of second semi-cylindrical coil layer are connected to each other and to a second resistance.

* * * * *